US008950235B2

(12) United States Patent
Heath

(10) Patent No.: US 8,950,235 B2
(45) Date of Patent: Feb. 10, 2015

(54) SELF-FLUSHING SMALL VOLUME PROVER APPARATUS, METHOD AND SYSTEM

(75) Inventor: Darren Paul Heath, Alpharett, GA (US)

(73) Assignee: Honeywell International Inc., Morristown, NJ (US)

( * ) Notice: Subject to any disclaimer, the term of this patent is extended or adjusted under 35 U.S.C. 154(b) by 549 days.

(21) Appl. No.: 13/328,126

(22) Filed: Dec. 16, 2011

(65) Prior Publication Data
US 2013/0152972 A1 Jun. 20, 2013

(51) Int. Cl.
*G01F 25/00* (2006.01)
*B08B 9/032* (2006.01)

(52) U.S. Cl.
CPC ........ *G01F 25/0007* (2013.01); *G01F 25/0015* (2013.01)
USPC .......................................... 73/1.19; 134/22.11

(58) Field of Classification Search
CPC ............ G01F 25/0007; G01F 25/0015; G01F 25/0053
USPC ........... 73/1.19; 134/22.11–22.22; 137/15.01, 137/15.04–15.05; 138/108
See application file for complete search history.

(56) References Cited

U.S. PATENT DOCUMENTS

| | | | |
|---|---|---|---|
| 3,120,118 A * | 2/1964 | Boyle | G01F 25/0015 |
| 3,492,856 A * | 2/1970 | Francisco, Jr. | 73/1.19 |
| 4,766,759 A | 8/1988 | Cohrs et al. | |
| 4,829,808 A * | 5/1989 | West | G01F 25/0015 |
| 5,052,211 A | 10/1991 | Cohrs et al. | |
| 5,052,212 A | 10/1991 | Cohrs | |
| 5,072,416 A | 12/1991 | Francisco, Jr. et al. | |
| 5,170,656 A * | 12/1992 | Draus | G01F 25/0007 |
| 5,251,489 A * | 10/1993 | Lalin | G01F 25/0015 |
| 5,317,895 A | 6/1994 | Ogawa et al. | |
| 5,392,632 A | 2/1995 | Umeda et al. | |
| 5,456,107 A * | 10/1995 | Padden et al. | 73/1.19 X |

(Continued)

FOREIGN PATENT DOCUMENTS

| | | | | |
|---|---|---|---|---|
| EP | 72916 A2 * | 3/1983 | | G01F 25/00 |
| GB | 2090419 A * | 7/1982 | | 73/861.56 |

(Continued)

OTHER PUBLICATIONS

Lee, G. D., "Series 1—Small Volume Provers: Identification, Terminology and Definitions," Nist Newsletter Mar. (2005), http://ts.nist.gov/WeightsAndMeasures/labmetrologypage.cfm, 5 pages.

(Continued)

*Primary Examiner* — Thomas P Noland
(74) *Attorney, Agent, or Firm* — Kermit D. Lopez; Luis M. Ortiz; Ortiz & Lopez, PLLC

(57) ABSTRACT

A self-flushing small volume prover apparatus, method and system for removing foreign materials. A piston can be configured with a valve arrangement located within a cylindrical object in order to permit fluid to pass through an annular passage when the piston travels from a downstream position to an upstream position. An inlet port and an outlet port can be located at the bottom of the cylindrical object. The outlet port can be welded at the bottom of the bore cylinder so that foreign material can flow directly out of the prover bore cylinder via the outlet port. The velocity of the piston can remove the collected foreign material from the bore cylinder via the outlet port, thus creating a self-flushing prover.

20 Claims, 2 Drawing Sheets

(56) References Cited

U.S. PATENT DOCUMENTS

| | | | |
|---|---|---|---|
| 7,028,528 B2 | 4/2006 | Antonijevic | |
| 8,511,138 B2 * | 8/2013 | Larsen et al. | ................... 73/1.19 |
| 2007/0169537 A1 | 7/2007 | Cotton | |
| 2008/0083262 A1 | 4/2008 | Augenstein et al. | |
| 2010/0241387 A1 * | 9/2010 | Ignatian | .............. G01F 25/0015 |
| 2011/0036178 A1 * | 2/2011 | Day | .................... G01F 20/0015 |
| 2012/0024037 A1 * | 2/2012 | Massey | ........................... 73/1.19 |
| 2012/0186323 A1 * | 7/2012 | Weaver | .............. G01F 25/0015 |
| 2012/0260717 A1 * | 10/2012 | Van Bekkum | ...... G01F 25/0015 |
| 2013/0073242 A1 * | 3/2013 | Larsen | ................ G01F 25/0015 |

FOREIGN PATENT DOCUMENTS

| | | | | |
|---|---|---|---|---|
| JP | 06050797 A | * | 2/1994 | ..................... 73/1.19 |
| JP | 11064075 A | * | 3/1999 | .............. G01F 25/00 |
| JP | 11211542 A | * | 8/1999 | .............. G01F 25/00 |
| SU | 484408 A1 | * | 12/1975 | .............. G01F 25/00 |
| WO | WO 2010109182 A1 | * | 9/2010 | .............. G01F 25/00 |

OTHER PUBLICATIONS

Lee, D., "Part 2—Small Volume Provers History, Design, and Operation,"NIST Newsletter Jun. (2005), http://ts.nist.gov/WeightsAndMeasures/labmetrologypage.cfm, 6 pages.

Lee, G. D., "Small Volume Proper (SVP) Proving Reports," NIST Newsletter Mar. (2006), http://ts.nist.gov/WeightsAndMeasures/labmetrologypage.cfm, 6 pages.

Whitman, S. K., "Operational Experiences Proving Mass Flow Meters with Small Volume Provers," *Energy Week Conference and Exhibition* (1996) Feb. 1, 6 pages.

Whitman, S., "Operational Experience with Small Volume Provers," Class #4110.1, Coastal Flow Liquid Measurement, Inc., no date, 5 pages. pp. 585-586, by Dec. 2011.

* cited by examiner

SELF-FLUSHING SMALL VOLUME PROVER APPARATUS, METHOD AND SYSTEM

TECHNICAL FIELD

Embodiments are generally related to flow meter proving systems and methods. Embodiments are also related to small volume provers. Embodiments are additionally related to the removal of foreign materials such as trash and particulate matter from a small volume prover.

BACKGROUND OF THE INVENTION

Meter provers and flow providing components utilize a known traceable volume to simulate actual operating conditions and to test and verify the performance of a flow meter. A SVP (Small Volume Prover) or piston prover can be employed to accurately measure flow in a fluid flow process and to calibrate, for example, a flow measurement device employed in custody transfers, pipe lines, etc. Small volume provers generally include a precisely honed cylinder with sensors that detect the initiation and termination of a stroke of a piston. Data concerning the volume of the stroke can then be employed to verify the volume measured by the device under test.

Small volume prover designs are generally not compatible with contaminated crude oil utilized in an oil and gas industry as such crude oil contains a higher concentration of trash and particulate matter. A problem associated with such prover designs is that the foreign material cannot be removed from the operation of the prover and subsequently, the collected debris can cause premature wear to the prover's internal components and surface. A vertically mounted prover can be employed, for example, as a solution to remove the foreign material from the prover. Such a design feature, however, is costly and non-user friendly, and is not retroactively compatible with earlier developments.

Based on the foregoing, it is believed that a need exists for an improved self-flushing small volume prover apparatus and method for removing foreign material from the prover, as will be described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved meter proving apparatus, method and system.

It is another aspect of the disclosed embodiments to provide for an improved self-flushing small volume prover method, apparatus and system.

It is a further aspect of the disclosed embodiments to provide for an improved method for removing collected foreign material from the prover apparatus.

The aforementioned aspects and other objectives and advantages can now be achieved as described herein. A self-flushing small volume prover apparatus and method for removing foreign material is disclosed herein. The apparatus includes a piston configured with a valve arrangement located inside a cylindrical object in order to permit fluid to pass through an annular passage when the piston is traveling from a downstream position to an upstream position. An inlet port and an outlet port can be located at the bottom of the cylindrical object. The outlet port can be welded at the bottom of the cylindrical object so that the foreign material (e.g., trash, debris, particle contaminants, etc.) can flow directly out of the cylindrical object (e.g., prover bore cylinder) via the outlet port. The velocity of the piston can remove the collected foreign material from the cylindrical object via the outlet port, thus creating a self-flushing prover.

A sensor can be mounted to the piston to continuously measure flow rate of the fluid when the piston moves between the upstream position and the downstream position. A proving run can be initiated to pull the piston into the upstream position and unlatch the piston from a chain drive return mechanism. The flow-through valve within the piston is closed during a movement of the piston from the upstream position to the downstream position. The flow-through valve is open when the piston moves from the downstream position to the upstream position in order to permit the fluid to flow freely through the cylindrical object via the inlet port and exit via the outlet port thereby removing the collected foreign material from the cylindrical object. Such small volume prover apparatus can be employed in crude oil applications so that the trash or particle contamination in crude oil can be easily removed via the outlet port.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
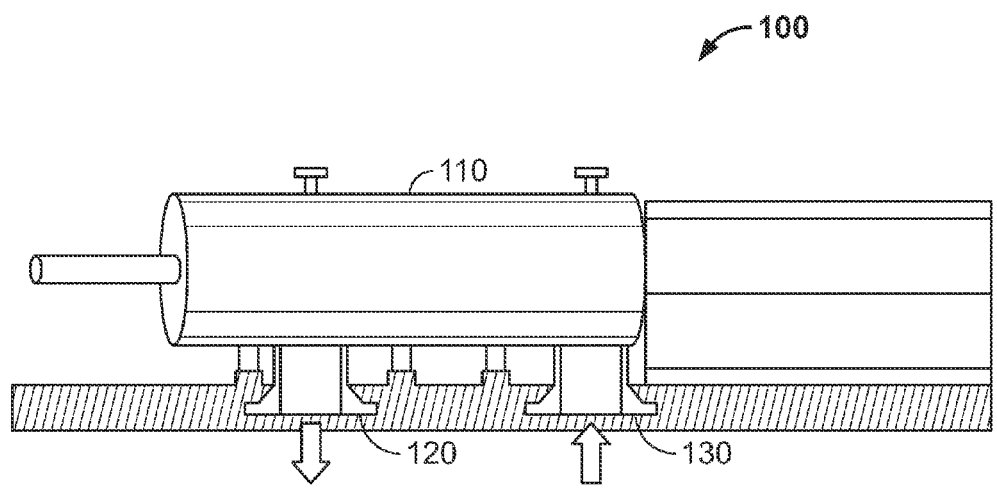
FIG. 1 illustrates a perspective view of a self-flushing small volume prover apparatus, in accordance with the disclosed embodiments.

FIG. 1 illustrates a perspective view of a self-flushing small volume prover apparatus 100, in accordance with the disclosed embodiments. The apparatus 100 can function based on a simple mechanical operation, with no hydraulics or pneumatics. The self-flushing small volume prover apparatus 100 can eliminate the build up of particulate matter from a flow tube and can be operated with respect to a variety of metering applications such as, for example, crude oil applications. The apparatus 100 can also utilize an electronic pulse-counting technique such as, for example, a double chronometry operation for calibrating the flow rate of a fluid.

The apparatus 100 generally includes a cylindrical object 110 (e.g., a flow tube, a precision bore cylinder, etc.) having an inlet port 130 and an outlet port 120 located at the bottom of the cylindrical object 110. Note that in FIGS. 1-3, identical or similar blocks are generally indicated by identical reference numerals. The cylindrical object 110 can maintain and house a piston 140 configured with a flow-through valve arrangement 150 in order to permit fluid to pass through an annular passage when the piston 140 is traveling from the downstream position to the upstream position. Note that the piston 140 is preferably a low-drag piston. Note also that in some embodiments the cylindrical object 110 may form a part of a pipe-line or can be provided in the shape of a pipe. The cylindrical object 110 has a known volume, which can be verified utilizing a water draw procedure. The cylindrical object 110 can function as the measurement chamber of the apparatus 100.

A sensor (not shown) can be mounted on or in association with the piston 140 for continuously detecting the velocity of the piston 140. The piston 140 can be configured from a material that is appropriate for the prover operating pressure, temperature, and desired resistance to degradation by the fluid that is being metered. In some embodiments, the flow-through valve 150 can be located within the piston 140 that permits fluid to flow through. The valve 150 can be closed when the piston 140 moves from an upstream position to a downstream position.

The flow-through valve 150 is open when the piston 140 moves from the downstream position to the upstream position in order to permit the fluid to flow freely through the cylindrical object 110 via the inlet port 110 and exit via the outlet port 120 thereby removing collected foreign material such as particulate matter, trash, and debris from the cylindrical object 110. The outlet port 120 is properly welded at the bottom of the cylindrical object 110 so that foreign materials (e.g., debris and particle contaminants) can flow directly out of the prover cylindrical object 110 via the outlet port 120. The velocity of the piston 140 can remove the collected foreign material from the cylindrical object 110 via the outlet port 120, thus creating a self-flushing prover.

The piston 140 can be positioned and launched via, for example, a chain drive mechanism. In such a chain drive mechanism scenario, a standby mode for the piston 140 can be, for example, the downstream position with the valve 150 open. The chain drive mechanism can pull the piston 140 to the upstream position. The piston 140 is then released and the valve 150 closes to start a proving run. The piston 140 can start the sensor 150 data acquisition as it travels the length of the calibrated section (e.g., precision bore cylinder) of the prover apparatus 100.

Figure 2:
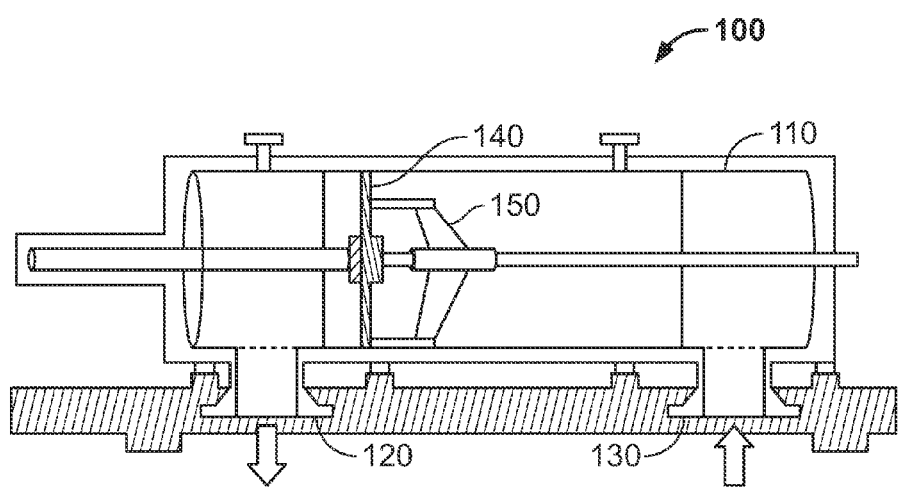
FIG. 2 illustrates a detailed perspective view of the self-flushing small volume prover apparatus having an outlet port located at the bottom of a cylindrical object, in accordance with the disclosed embodiments.

FIG. 2 illustrates a detailed perspective view of the self-flushing small volume prover apparatus 100 having the outlet port 120 located at the bottom of a cylindrical object 110, in accordance with the disclosed embodiments. A proving run can be initiated for pulling the piston 140 into the upstream position. The piston 140 can then be unlatched from, for example, a chain drive return mechanism. The low-drag piston 140 traveling down the cylinder 110, for example, is free to follow the flow of the fluid with the least possible effect on the flow stream. When the piston 140 is released, the flow-through valve 150 closes via a spring tension and the piston velocity is synchronized with the fluid velocity. The sensor can be actuated if the piston 140 is released after a short run.

The fluid pressure in the apparatus 100 generally pushes the perimeter of the piston 140 further downstream, opening the flow-through valve 150, thereby permitting the flow to continue with little to no pulsation or surge in line pressure. The trash or particulate matter in crude oil can be easily removed via the outlet port 120. Note that the piston 140 can travel in the direction of a single axis and the velocity monotonically increases in a relatively predictable fashion. The apparatus 100 can also calculate the volumetric flow rate utilizing a double chronometry approach. The double chronometry approach provides fractional meter pulse counting for calibrating the rate of flow of the fluid. The double chronometry approach provides exact time discrimination and pulse counting, which achieves a higher accuracy in calibration of the fluid flow.

Figure 3:
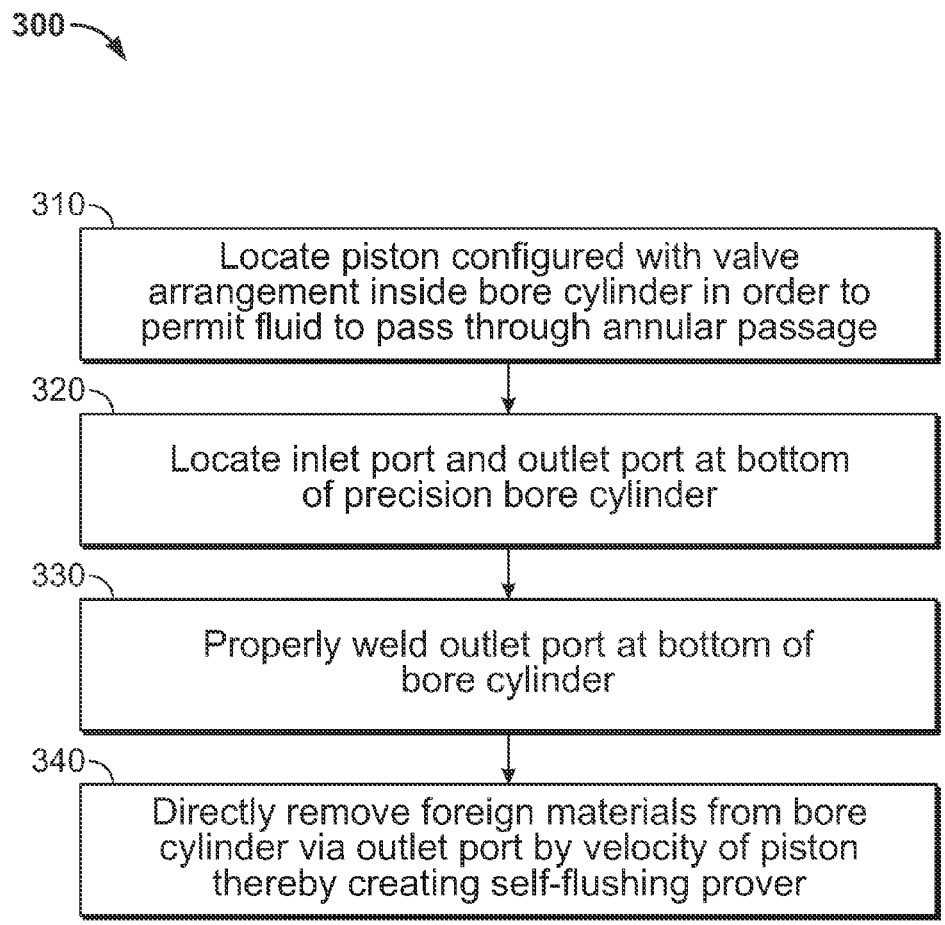
FIG. 3 illustrates a high level flow chart of operation illustrating logical operational steps of a method for removing collected foreign materials from the prover apparatus via an outlet port located at the bottom of the cylindrical object, in accordance with the disclosed embodiments.

FIG. 3 illustrates a high level flow chart of operation illustrating logical operational steps of a method for removing collected debris from the prover apparatus via an outlet port 120 located at the bottom of the cylindrical object 110, in accordance with the disclosed embodiments. The piston 140 configured with a valve arrangement 150 can be located inside a cylindrical object 110 in order to permit fluid to pass through an annular passage when the piston 140 is traveling from the downstream position to the upstream position, as indicated at block 310.

The inlet port 130 and the outlet port 120 can be located at the bottom of the cylindrical object 110, as shown at block 320. The outlet port 120 is properly welded at the bottom of the cylindrical object 110, as illustrated at block 330. The foreign materials (e.g., trash, debris, and particle contaminants) can be directly removed from the prover cylindrical object 110 via the outlet port 120, as depicted at block 340. The velocity of the piston 140 can remove the collected foreign material from the cylindrical object 110 via the outlet port 120, thus creating a self-flushing prover.

Based on the foregoing, it can be appreciated that various embodiments, preferred and alternative, are disclosed herein. For example, in one embodiment, a small volume prover apparatus can include a piston maintained by and housed within a cylindrical object, the piston configured with a flow-through valve arrangement that allows a fluid to pass through an annular passage when the piston travels from a downstream position to an upstream position. Such an embodiment may also include an outlet port and an inlet port located at a bottom of the cylindrical object, wherein the outlet port located at the bottom of the cylindrical object assists in directly removing foreign material from the precision cylinder to thereby permit the apparatus to function as a self-flushing prover.

In another embodiment, a sensor can be mounted to the piston, such that the sensor continuously detects a velocity of the piston when the piston moves between the upstream position to the downstream position. Data collected from the sensor can assist in calculating a volumetric flow rate of the fluid. In yet another embodiment, the outlet port can be welded at the bottom of the cylindrical object to automatically self-flush the foreign material via the outlet port. In still another embodiment, the velocity of the piston can assist in removing the collected foreign material from the bore cylinder via the outlet port. In another embodiment, the aforementioned cylindrical object can be a precision bore cylinder.

In yet another embodiment, a method for removing foreign material can be implemented. Such a method can include, for example, locating a piston configured with a valve arrangement located inside a cylindrical object in order to permit fluid to pass through an annular passage when the piston travels from a downstream position to an upstream position; mounting an outlet port and an inlet port at the bottom of the cylindrical object; and welding the outlet port at the bottom of the bore cylinder in order to thereafter directly remove foreign material from the cylindrical object.

In an alternative embodiment of such a method, a step can be provided for continuously detecting a velocity of the piston when the piston moves between the upstream position to the downstream position in order to calculate a volumetric flow rate of the fluid. In another embodiment, a step can be provided for initiating a proving to pull the piston into the upstream position and unlatch the piston from a chain drive return mechanism. In still another embodiment, a step can be provided for closing a flow-through valve within the piston during a movement of the piston from the upstream position to the downstream position.

In yet other embodiments, a step can be provided for opening the flow-through valve when the piston moves from the downstream position to the upstream position in order to permit the fluid to flow freely through the cylindrical object via the inlet port and exit via the outlet port thereby removing the collected foreign material from the bore cylinder by the velocity of the piston.

In another embodiment, a small volume prover system can be implemented. Such a system can include, for example, a piston maintained by and housed within a cylindrical object, the piston having with a flow-through valve arrangement that allows a fluid to pass through an annular passage when the piston travels from a downstream position to an upstream position; an outlet port and an inlet port located at a bottom of the cylindrical object, the outlet port located at the bottom of the cylindrical object to assist in directly removing foreign material from the precision cylinder and permit the apparatus to function as a self-flushing prover; and a sensor mounted to the piston, wherein the sensor continuously detects a velocity of the piston when the piston moves between the upstream position to the downstream position.

In another embodiment, data collected from the sensor can assist in calculating a volumetric flow rate of the fluid. In still another embodiment, the outlet port can be welded at the bottom of the cylindrical object to automatically self-flush the foreign material via the outlet port. In yet another embodiment, the velocity of the piston can assist in removing the collected foreign material from the bore cylinder via the outlet port. In other embodiments of such a system, the cylindrical object can comprise a precision bore cylinder.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A small volume prover apparatus, said apparatus comprising:
    a low-drag piston maintained by and housed within a cylindrical object, said piston configured with a flow-through valve arrangement that allows a fluid to pass through an annular passage when said piston travels from a downstream position to an upstream position; and
    an outlet port and an net port located at a bottom of said cylindrical object, wherein said outlet port located at said bottom of said cylindrical object assists in directly removing foreign material from said precision cylinder to thereby permit said apparatus to function as a self-flushing prover.

2. The apparatus of claim 1 further comprising a sensor mounted to said piston that continuously detects a velocity of said piston when said piston moves between said upstream position to said downstream position, wherein data collected from said sensor assists in calculating a volumetric flow rate of said fluid and wherein said sensor is actuated if said piston is released after a short run.

3. The apparatus of claim 2 wherein said outlet port is welded at a bottom of said cylindrical object to automatically self-flush said foreign material via said outlet port.

4. The apparatus of claim 3 wherein said velocity of said piston assists in removing said collected foreign material from said bore cylinder via said outlet port.

5. The apparatus of claim 3 wherein said cylindrical object comprises a precision bore cylinder.

6. The apparatus of claim 1 wherein said outlet port is welded at a bottom of said cylindrical object to automatically self-flush said foreign material via said outlet port.

7. The apparatus of claim 6 wherein said velocity of said piston assists in removing said collected foreign material from said bore cylinder via said outlet port.

8. The apparatus of claim 7 wherein said cylindrical object comprises a precision bore cylinder.

9. A method for removing foreign material, said method comprising:
    locating a low-drag piston configured with a valve arrangement located inside a cylindrical object in order to permit fluid to pass through an annular passage when said piston travels from a downstream position to an upstream position;
    mounting an outlet port and an inlet port at said bottom of said cylindrical object; and
    welding said outlet port at bottom of said bore cylinder in order to thereafter directly remove foreign material from said cylindrical object.

10. The method of claim 9 further comprising continuously detecting a velocity of said piston via a sensor when said piston moves between said upstream position to said downstream position in order to calculate a volumetric flow rate of said fluid and wherein said sensor is actuated if said piston is released after a short run.

11. The method of claim 9 further comprising initiating a proving to pull said piston into said upstream position and unlatch said piston from a chain drive return mechanism.

12. The method of claim 9 wherein said valve arrangement allows for closing a flow-through valve within said piston during a movement of said piston from said upstream position to said downstream position.

13. The method of claim 9 wherein said valve arrangement allows for opening said flow-through valve when said piston moves from said downstream position to said upstream position in order to permit said fluid to flow freely through said cylindrical object via said inlet port and exit via said outlet port thereby removing said collected foreign material from said bore cylinder by said velocity of said piston.

14. A small volume prover system, said system comprising:
   a low-drag piston maintained by and housed within a cylindrical object, said piston having with a flow-through valve arrangement that allows a fluid to pass through an annular passage when said piston travels from a downstream position to an upstream position;
   an outlet port and an inlet port located at a bottom of said cylindrical object, said outlet port located at said bottom of said cylindrical object to assist in directly removing foreign material from said precision cylinder and permit said apparatus to function as a self-flushing prover; and
   a sensor mounted to said piston, wherein said sensor continuously detects a velocity of said piston when said piston moves between said upstream position to said downstream position and wherein said sensor is actuated if said piston is released after a short run.

15. The system of claim 14 wherein data collected from said sensor assists in calculating a volumetric flow rate of said fluid.

16. The system of claim 14 wherein said outlet port is welded at a bottom of said cylindrical object to automatically self-flush said foreign material via said outlet port.

17. The system of claim 14 wherein said velocity of said piston assists in removing said collected foreign material from said bore cylinder via said outlet port.

18. The system of claim 14 wherein said cylindrical object comprises a precision bore cylinder.

19. The system of claim 14 wherein:
   said outlet port is welded at a bottom of said cylindrical object to automatically self-flush said foreign material via said outlet port; and
   said velocity of said piston assists in removing said collected foreign material from said bore cylinder via said outlet port.

20. The system of claim 14 wherein:
   said cylindrical object comprises a precision bore cylinder;
   said outlet port is welded at a bottom of said cylindrical object to automatically self-flush said foreign material via said outlet port; and
   said velocity of said piston assists in removing said collected foreign material from said bore cylinder via said outlet port.

* * * * *